United States Patent
Lee et al.

(10) Patent No.: US 11,581,600 B2
(45) Date of Patent: Feb. 14, 2023

(54) VENTING DEVICE

(71) Applicant: LG Chem, Ltd., Seoul (KR)

(72) Inventors: Jae Ho Lee, Daejeon (KR); Yong Su Choi, Daejeon (KR); Sang Hun Kim, Daejeon (KR); Hyung Kyun Yu, Daejeon (KR); Na Yoon Kim, Daejeon (KR)

(73) Assignee: LG Energy Solution, Ltd.

( * ) Notice: Subject to any disclaimer, the term of this patent is extended or adjusted under 35 U.S.C. 154(b) by 36 days.

(21) Appl. No.: 16/982,353

(22) PCT Filed: Dec. 6, 2019

(86) PCT No.: PCT/KR2019/017195
§ 371 (c)(1),
(2) Date: Sep. 18, 2020

(87) PCT Pub. No.: WO2020/175773
PCT Pub. Date: Sep. 3, 2020

(65) Prior Publication Data
US 2021/0036269 A1    Feb. 4, 2021

(30) Foreign Application Priority Data

Feb. 25, 2019 (KR) ........................ 10-2019-0022033

(51) Int. Cl.
*H01M 50/10* (2021.01)
*H01M 50/30* (2021.01)
(Continued)

(52) U.S. Cl.
CPC ......... *H01M 50/10* (2021.01); *H01M 50/105* (2021.01); *H01M 50/107* (2021.01); *H01M 50/30* (2021.01); *H01M 50/333* (2021.01)

(58) Field of Classification Search
CPC .... H01M 50/10; H01M 50/30; H01M 50/333; H01M 50/105; H01M 50/107
See application file for complete search history.

(56) References Cited

U.S. PATENT DOCUMENTS 2,201,510 A * 5/1940 Waner ................. H01M 50/308
429/77
5,258,242 A * 11/1993 Dean .................... H01M 50/317
429/54
(Continued)

FOREIGN PATENT DOCUMENTS

CA    2099657 A1    2/1994
CN    103597631 A    2/2014
(Continued)

OTHER PUBLICATIONS

Machine Translation of: KR 10-2015-0118781, Kim, Oct. 23, 2015.*
(Continued)

*Primary Examiner* — Kenneth J Douyette
(74) *Attorney, Agent, or Firm* — Lerner, David, Littenberg, Krumholz & Mentlik, LLP

(57) ABSTRACT

A venting device for insertion into a sealing part of a pouch of a secondary battery includes: a housing configured to be inserted between two surfaces of the sealing part so as to be sealed together with the sealing part; a sheet disposed in the housing and defining a passage through which an inside and an outside of the pouch are configured to communicate with each other; a plate spring configured to open and close the passage according to an internal pressure of the pouch and made of a metal having elasticity; and a ball disposed between the sheet and the plate spring so as to contact or be spaced apart from the sheet at an outlet-side of the passage, thereby opening and closing the passage, wherein the ball (Continued)

has a hemispherical shape to be attached to an inner surface of the plate spring.

15 Claims, 14 Drawing Sheets

(51) Int. Cl.
*H01M 50/107* (2021.01)
*H01M 50/105* (2021.01)
*H01M 50/333* (2021.01)

(56) References Cited

U.S. PATENT DOCUMENTS

| | | | |
|---|---|---|---|
| 9,397,325 B2 | 7/2016 | Kinuta et al. | |
| 10,522,795 B2 | 12/2019 | Kim | |
| 10,680,221 B2 | 6/2020 | Choi et al. | |
| 2005/0164081 A1* | 7/2005 | Ogura | H01M 50/555 |
| | | | 429/185 |
| 2014/0120387 A1 | 5/2014 | Kinuta et al. | |
| 2016/0036024 A1 | 2/2016 | Choi et al. | |
| 2016/0315294 A1 | 10/2016 | Kim | |

FOREIGN PATENT DOCUMENTS

| | | |
|---|---|---|
| CN | 105900274 A | 8/2016 |
| EP | 2709191 A1 | 3/2014 |
| JP | H06196150 A | 7/1994 |
| JP | 3023677 U | 4/1996 |
| JP | H11339746 A | 12/1999 |
| JP | H11354100 A | 12/1999 |
| JP | 2003338270 A | 11/2003 |
| JP | 2006313715 A | 11/2006 |
| JP | 2008166833 A | 7/2008 |
| JP | 2008198664 A | 8/2008 |
| JP | 2010255757 A | 11/2010 |
| JP | 2012195218 A | 10/2012 |
| JP | 2012195219 A | 10/2012 |
| JP | 2016031934 A | 3/2016 |
| JP | 6085566 B2 | 2/2017 |
| KR | 20010046466 A | 6/2001 |
| KR | 20060011046 A | 2/2006 |
| KR | 20140032833 A | 3/2014 |
| KR | 20140053010 A | 5/2014 |
| KR | 20140085764 A | 7/2014 |
| KR | 20150118781 A | 10/2015 |
| KR | 20150121912 A | 10/2015 |
| KR | 20160014828 A | 2/2016 |
| KR | 20160051037 A | 5/2016 |
| WO | 2013146803 A1 | 10/2013 |
| WO | 2015160134 A1 | 10/2015 |

OTHER PUBLICATIONS

International Search Report for Application No. PCT/KR2019/017195 dated Mar. 23, 2020, 2 pages.

Extended European Search Report for Application No. EP19916644, dated Jun. 14, 2021, 8 pages.

Search Report dated Mar. 29, 2022 from the Office Action for Chinese Application No. 201980018373.2 issued Apr. 2, 2022, 3 pages.

* cited by examiner

VENTING DEVICE

CROSS-REFERENCE TO RELATED APPLICATION

The present application is a national phase entry under 35 U.S.C. § 371 of International Application No. PCT/KR2019/017195, filed Dec. 6, 2019, published in Korean, which claims the benefit of the priority of Korean Patent Application No. 10-2019-0022033, filed on Feb. 25, 2019, which are hereby incorporated by reference in their entireties.

TECHNICAL FIELD

The present invention relates to a venting device, and more particularly, to venting devices of which at least one is inserted into a sealing part of a pouch of a secondary battery to discharge a gas within the pouch to the outside and minimize bending of a plate spring in a closed state.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material. Also, in the can type secondary battery, an electrode assembly is accommodated in a case made of a metal or plastic material.

The secondary battery may be deteriorated in safety due to various problems such as internal short circuit due to an external impact, heat generation due to overcharging and overdischarging, electrolyte decomposition due to the generated heat, and a thermal runaway phenomenon. Particularly, when a gas is generated due to decomposition of an electrolyte to increase in pressure within the secondary battery, a problem occurs that the secondary battery is exploded.

Particularly, when the secondary battery is repeatedly charged and discharged, a gas is generated by electrochemical reaction between the electrolyte and an electrode active material. Here, the generated gas may allow the secondary battery to increase in internal pressure to cause problems such as weakening of bonding force between components, damage of a case of the secondary battery, an early operation of a protection circuit, deformation of an electrode, internal short circuit, explosion, and the like. Thus, in the case of the can type secondary battery, a protection member such as a CID filter and a safety vent is provided to physically interrupt an electrical connection when an internal pressure of a case increases. However, in the case of the pouch type secondary battery according to the related art, the protection member is not sufficiently provided.

DISCLOSURE OF THE INVENTION

Technical Problem

An object of the present invention is to provide venting devices of which at least one is inserted into a sealing part of a pouch of a secondary battery to discharge a gas within the pouch to the outside and minimize bending of a plate spring in a closed state.

The objects of the present invention are not limited to the aforementioned object, but other objects not described herein will be clearly understood by those skilled in the art from descriptions below.

Technical Solution

A venting device for insertion into a sealing part of a pouch of a secondary battery, according to an embodiment of the present invention for solving the above problem includes: a housing configured to be inserted between two surfaces of the sealing part so as to be sealed together with the sealing part; a sheet disposed in the housing and defining a passage through which an inside and an outside of the pouch are configured to communicate with each other; a plate spring configured to open and close the passage according to an internal pressure of the pouch and made of a metal having elasticity; and a ball disposed between the sheet and the plate spring so as to contact or be spaced apart from the sheet at an outlet-side of the passage, thereby opening and closing the passage, wherein the ball has a hemispherical shape to be attached to an inner surface of the plate spring.

Also, the plate spring may include: a central portion formed at a center thereof; and a peripheral portion extending outward from the central portion, wherein the ball may be attached to the central portion, and a gas exhaust hole may be defined in the peripheral portion.

Also, the plate spring may have one side having a cap shape that is convex outward and provide an insertion space into which the sheet and the ball are inserted therein.

Also, an end of another side of the plate spring may be bent toward the sheet inserted into the insertion space.

Also, the plate spring may have a flat plate shape and contact the sheet.

Also, in the sheet, an edge of an inner circumference of a surface of the outlet-side of the passage may be chamfered or filleted.

Also, in the sheet, an edge of an outer circumference of a surface of the outlet-side of the passage may be chamfered or filleted.

Also, the housing may include an upper housing and a lower housing, which have shapes or sizes different from each other.

Also, the lower housing may have a width less than a width of the upper housing.

Also, the upper housing may have a circular cylinder shape, and the lower housing may have an oval cylinder shape.

Also, the present invention provides a pouch type secondary battery in which the venting device is inserted into a sealing part of a pouch, a battery module including the pouch type secondary battery as a unit cell, and a device including the battery module.

The device may include a computer, a notebook, a smart phone, a mobile phone, a tablet PC, a wearable electronic device, a power tool, an electric vehicle (EV), a hybrid electric vehicle (HEV), a plug-in hybrid electric vehicle (PHEV), or a power storage device, but is not limited thereto.

The structures of the battery module and the device and the method for manufacturing them are well known in the art, and thus their detailed descriptions will be omitted herein.

Particularities of other embodiments are included in the detailed description and drawings.

Advantageous Effects

The embodiments of the present invention may have at least the following effects.

The bending of the plate spring may be minimized in the state in which the venting devices are closed to reduce the deviation in opening pressure between the venting devices.

Also, the deviation between the numerical value of the opening pressure, which is designed before manufacturing the venting device, and the actual opening pressure may be reduced.

The effects of the prevent invention are not limited by the aforementioned description, and thus, more varied effects are involved in this specification.

MODE FOR CARRYING OUT THE INVENTION

Figure 1:
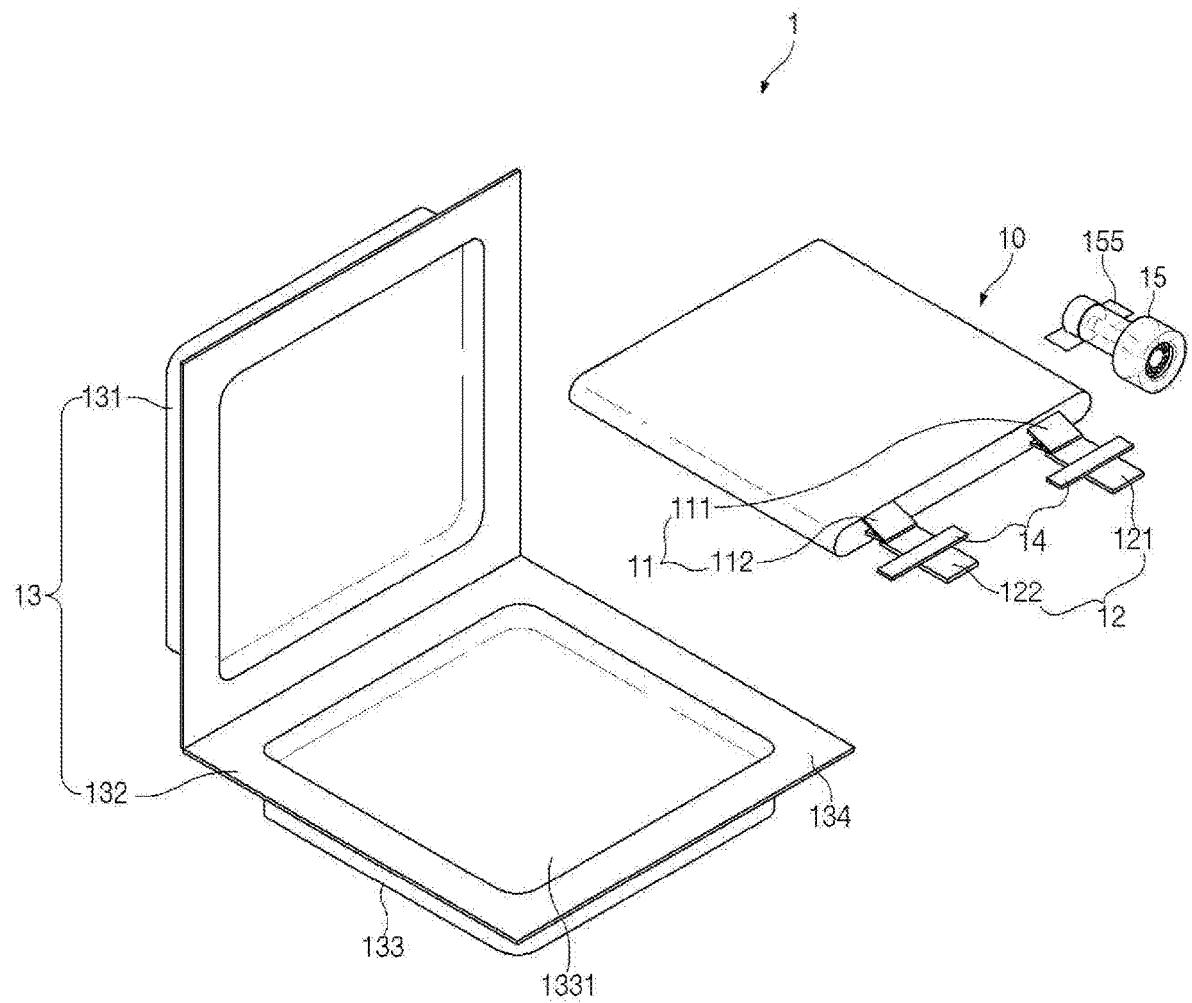
FIG. 1 is an exploded view of a secondary battery including a venting device according to an embodiment of the present invention.

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 2:
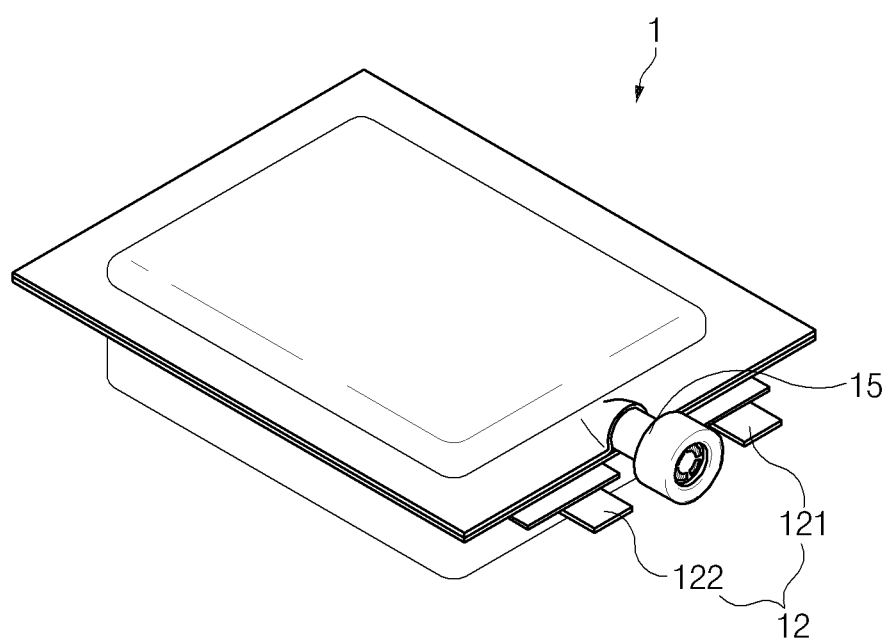
FIG. 2 is a perspective view of the secondary battery of FIG. 1, which is completely manufactured.

FIG. 1 is an exploded view of a secondary battery 1 including a venting device 15 according to an embodiment of the present invention, and FIG. 2 is a perspective view of the secondary battery 1 of FIG. 1, which is completely manufactured.

In a process of manufacturing a pouch type secondary battery 1, first, slurry in which an electrode active material, a binder, and a plasticizer are mixed with each other is applied to a positive electrode collector and a negative electrode collector to manufacture electrodes such as a positive electrode and a negative electrode. Thereafter, the negative electrode collector and the positive electrode plate are respectively stacked on both sides of a separator to form an electrode assembly 10 having a predetermined shape, and then, the electrode assembly 10 is inserted into a battery case 13, an electrolyte is injected, and sealing is performed.

Specifically, the electrode assembly 10 includes two types of electrodes, such as the positive electrode and the negative electrode, and the separator interposed between the electrodes to insulate the electrodes from each other. The electrode assembly 10 may be a stack type, a jelly roll type, a stacked and folding type, or the like. Each of the two types of electrodes, i.e., the positive electrode and the negative electrode has a structure in which active material slurry is applied to the electrode collector having a metal foil or metal mesh shape. The slurry may be usually formed by agitating a granular active material, an auxiliary conductor, a binder, and a plasticizer with a solvent added. The solvent may be removed in the subsequent process.

As illustrated in FIG. 1, the electrode assembly 10 includes an electrode tab 11. The electrode tab 11 protrudes from each of the positive electrode and the negative electrode of the electrode assembly 10 to provide a path, through which electrons move, between the inside and outside of the electrode assembly 10. A collector of the electrode assembly 10 is constituted by a portion coated with an electrode active material and a distal end, on which the electrode active material is not applied, i.e., a non-coating portion. Also, the electrode tab 11 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. Also, a portion of the electrode lead 12 is surrounded by an insulation part 14. An insulation part 14 may be disposed to be limited within a sealing part 134, at which an upper case 131 and a lower case 132 are thermally fused, so as to be bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 includes a positive electrode lead 121 having one end connected to a positive electrode tab 111 to extend in a direction in which the positive electrode tab 111 protrudes and a negative electrode lead 122 having one end connected to a negative electrode tab 112 to extend in a direction in which the negative electrode tab 112 protrudes. On the other hand, as illustrated in FIG. 1, all of the other ends of the positive electrode lead 121 and the negative electrode lead 122 protrude to the outside of the battery case 13. As a result, electricity generated in the electrode assembly 10 may be supplied to the outside. Also, since each of the positive electrode tab 111 and the negative electrode tab 112 is formed to protrude in various directions, each of the positive electrode lead 121 and the negative electrode lead 122 may extend in various directions.

The positive electrode lead 121 and the negative electrode lead 122 may be made of materials different from each other. That is, the positive electrode lead 121 may be made of the same material as the positive current collector, i.e., an aluminum (Al) material, and the negative electrode lead 122 may be made of the same material as the negative current collector, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material. Hereinafter, the case in which the battery case 13 is the pouch will be described. The battery case 13 accommodates the electrode assembly 10 so that a portion of the electrode lead 12, i.e., the terminal part is exposed and then is sealed. As illustrated in FIG. 1, the battery case 13 includes the upper case 131 and the lower case 132. An accommodation space 1331 in which a cup part 133 is formed to accommodate the electrode assembly 10 may be provided in the lower case 132, and upper case 131 may cover an upper side of the accommodation space 1331 so that the electrode assembly 10 is not separated to the outside of the battery case 13. Here, as illustrated in FIG. 1, the cup part 133 having the accommodation space 1331 may be formed in the upper case 131 to accommodate the electrode assembly 10 in the upper portion. As illustrated in FIG. 1, one side of the upper case 131 and one side of the lower case 132 may be connected to each other. However, the present invention is not limited thereto. For example, the upper case 131 and the lower case 132 may be separately manufactured to be separated from each other.

After the upper case 131 and the lower case 132 of the battery case 13 contact each other, the sealing part 134 formed on an edge may be sealed. Here, as illustrated in FIG. 1, according to an embodiment of the present invention, the venting device 15 is inserted between both surfaces of the sealing part 134 so as to be sealed together with the sealing part 134 and thus be fixed within the sealing part 134. Also, the venting device 15 includes a passage through which the inside and the outside of the battery case 13 communicate with each other. When an internal pressure of the battery case 13 increases, an internal gas is discharged to the outside to adjust the pressure. The venting device 15 will be described below in detail.

When an electrode lead 12 is connected to the electrode tab 11 of the electrode assembly 10, and the insulation part 14 is provided on a portion of the electrode lead 12, the electrode assembly 10 may be accommodated in the accommodation space 1331 provided in the cup part 133 of the lower case 132, and the upper case 131 may cover an upper portion of the accommodation space 1331. Also, the electrolyte is injected, and the sealing part provided on an edge of each of the upper case 131 and the lower case 132 is sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. As illustrated in FIG. 2, the pouch type secondary battery 1 may be manufactured through the above-described method.

Figure 3:
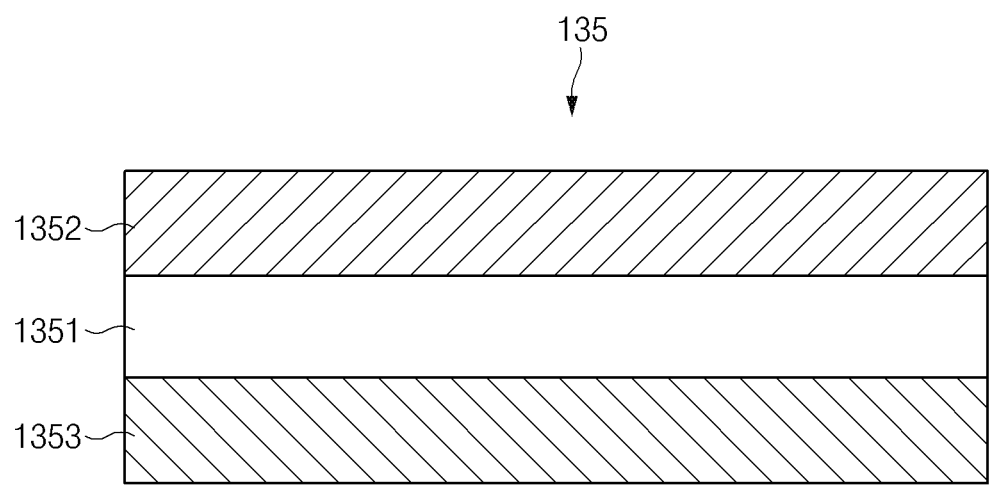
FIG. 3 is a cross-sectional view of a pouch film forming a battery case according to an embodiment of the present invention.

FIG. 3 is a cross-sectional view of a pouch film 135 forming the battery case 13 according to an embodiment of the present invention.

The battery case 13 is manufactured by performing drawing on the pouch film 135. That is, the pouch film 135 is elongated to form the cup part 133, thereby manufacturing the battery case 13. As illustrated in FIG. 3, the pouch film 135 includes a gas barrier layer 1351, a surface protection layer 1352, and a sealant layer 1353.

The gas barrier layer 1351 may secure mechanical strength of the battery case 13, block introduction and discharge of a gas or moisture outside the secondary battery 1, and prevent the electrolyte from leaking. In general, the gas barrier layer 1351 includes a metal. Particularly, aluminum (Al) foil is mainly used for the gas barrier layer 1351. Aluminum may secure the mechanical strength of a predetermined level or more, but be light in weight. Thus, aluminum may secure complement and heat dissipation for electrochemical properties of the electrode assembly 10 and the electrolyte. However, the present invention is not limited thereto. For example, the gas barrier layer 1351 may be made of various materials. For example, the gas barrier layer 1351 may be made of one material or a mixture of two or more materials selected from the group consisting of Fe, C, Cr, Mn, Ni and Al. Here, the gas barrier layer 1351 is made of a material containing iron, the mechanical strength may be improved. When the gas barrier layer 1351 is made of a material containing aluminum, flexibility may be improved. Thus, the material forming the gas barrier layer 1351 may be used in consideration of the characteristics of the gas barrier layer 1351.

The surface protection layer 1352 is made of a polymer and disposed at the outermost layer to protect the secondary battery 1 against external friction and collision and also electrically insulates the electrode assembly 10 from the outside. Here, the outermost layer represents a direction opposite to a direction in which the electrode assembly 10 is disposed with respect to the gas barrier layer 1351, i.e., in an outward direction. The surface protection layer 1352 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, Teflon, and glass fiber. Particularly, a polymer such as a nylon resin or polyethylene terephthalate (PET) having mainly abrasion resistance and heat resistance is used. Also, the surface protection layer 1352 may have a single layer structure made of one material or a composite layer structure in which two or more materials are respectively formed as layers.

The sealant layer 1353 is made of a polymer and disposed at the innermost layer to directly contact the electrode assembly 10. The pouch type battery case 13 may be manufactured while a portion thereof is elongated to form the cup part 133 having the accommodation space 1331 having a bag shape when the pouch film 135 having the stacked structure as described above is drawn by using a punch or the like. Also, when the electrode assembly 10 is accommodated in the accommodation space 1331, the electrolyte is injected. Thereafter, when the upper case 131 and the lower case 132 may contact each other, and thermal compression is applied to the sealing part 134, the sealant layers 1353 may be bonded to each other to seal the battery case 13. Here, since the sealant layer 1353 directly contacts the electrode assembly 10, the sealant layer 1353 may have to have insulating properties. Also, since the sealant layer 1353 contacts the electrolyte, the sealant layer 1353 may have to have corrosion resistance. Also, since the inside of the battery case 13 is completely sealed to prevent materials from moving between the inside and outside of the battery case 13, high sealability has to be realized. That is, the sealing part 134 in which the sealant layers 1353 are bonded to each other should have superior bonding strength. In general, the sealant layer 1353 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, Teflon, and glass fiber. Particularly, a polyolefin-based resin such as polypropylene (PP) or polyethylene (PE) may be used for the sealant layer 1353. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 1353. Furthermore, the sealant layer 23 may be made of a cated polypropylene or a polypropylene-butylene-ethylene terpolymer. Also, the sealant layer 1353 may have a single layer structure made of one material or a composite layer structure in which two or more materials are respectively formed as layers.

Figure 4:
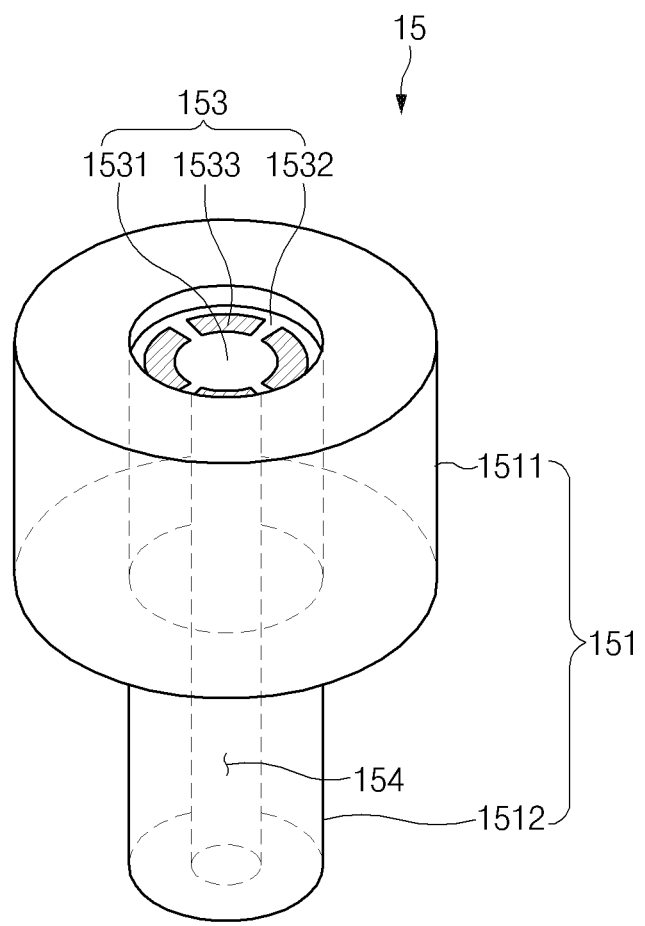
FIG. 4 is a perspective view of a venting device according to an embodiment of the present invention.

FIG. 4 is a perspective view of the venting device 15 according to an embodiment of the present invention.

The secondary battery 1 according to an embodiment of the present invention further includes at least one venting device 15. According to an embodiment of the present invention, the bending of the plate spring 153 in the closed state of the venting device 15 may be minimized to reduce a deviation in opening pressure between the venting devices 15. Also, the deviation between a numerical value of the opening pressure, which is designed before manufacturing the venting device 15, and an actual opening pressure may be reduced. Here, the opening pressure means a specific pressure within the battery case 13 when the venting device 15 is opened.

For this, the venting device 15, which is inserted into a sealing part 134 of a pouch of the secondary battery 1, according to an embodiment of the present invention includes: a housing 151 inserted into both surfaces of the sealing part 134 so as to be sealed together with the sealing part 134; a sheet 152 which is formed in the housing 151 and through which a passage 154, through which the inside and outside of the pouch communicate with each other, passes; a plate spring 153 which opens and closes the passage 154 according to an internal pressure of the pouch and is made of made of a metal having elasticity; and a ball 155 disposed between the sheet 152 and the plate spring 153 so as to contact or be spaced apart from the sheet 152 at an outlet-side of the passage 154, thereby opening and closing the passage 154. The ball 155 may have a hemispherical shape to be attached to an inner surface of the plate spring 153.

The housing 151 may be inserted between both the surfaces of the sealing part 134 so as to be sealed together with the sealing part 134. When the housing 151 is inserted between both the surfaces of the sealing part 134, a sealant layer 1353 that is the innermost layer of the sealing part 134 contacts the housing 151. Also, when heat and a pressure are applied, a sealant layer 1353 of the sealing part 134 is fused to be sealed together with the housing 151. As illustrated in FIG. 4, the housing 151 may include an upper housing 1511 and a lower housing 1512, and a stepped portion may be formed between the upper housing 1511 and the lower housing 1512. The stepped portion may be formed because the upper housing 1511 and the lower housing 1512 have shapes and sizes different from each other. For example, the upper housing 1511 may have a transverse cross-section having a circular cylinder shape, and the lower housing 1512 may have a transverse cross-section having an oval cylinder shape. Alternatively, the lower housing 1512 may have a width less than that of the upper housing 1511. Thus, the lower housing 1512 may be inserted between both the surfaces of the sealing part 134 so as to be sealed together with the sealing part 134. Thus, the lower housing 1512 may be fused to the inner surface of the sealing part 134, and the upper housing 1511 may protrude to the outside of the pouch.

Here, if the lower housing 1512 has an excessively large width, the sealing part 134 has to be deformed in size. Thus, the sealing of the sealing part 134 may be damaged. Thus, the lower housing 1512 may have a width less than a thickness of the sealing part 134. Particularly, it is preferable that a long axis of the transverse cross-section has a width that is less than 6 mm. Also, as described above, the lower housing 1512 may have an oval cylinder shape having an oval transverse cross-section. Thus, the lower housing 1512 may be easily sealed to the sealing part 134, and the sealing may be maintained for a long time without being broken.

Also, if the upper housing 1511 has an excessively large size, the upper housing 1511 protruding to the outside of the pouch may interfere with other secondary batteries 1 that are disposed in the vicinity of the upper housing 1511. Thus, it may be difficult to assemble a package or module of the secondary battery 1. Thus, the upper housing 1511 may have a width less than a thickness of the sealing part 134. Particularly, it is preferable that the transverse cross-section has a diameter less than 8 mm. However, the present invention is not limited thereto. For example, the upper housing 1511 and the lower housing 1512 may have various shapes, for example, one cylinder shape without being distinguished from each other.

The sheet 152 may be formed in the housing 151. Also, the passage 154 through which the inside and the outside of the pouch communicate with each other may be formed to pass through a center of the sheet 152. The sheet 152 will be described below in detail.

The plate spring 153 may be made of a metal to open and close the passage 154 formed in the sheet 152 according to an internal pressure of the pouch. Particularly, when the internal pressure of the pouch is less than a specific pressure, the plate spring 153 closes an outlet 1541 of the passage 154. Also, when the internal pressure of the pouch gradually increase to exceed the specific pressure, the plate spring 153 may be spaced apart from the sheet 152 to open the outlet 1541 of the passage 154.

According to the related art, the passage 154 is opened and closed by using a coil spring. However, the venting device has to be miniaturized so as to be inserted into the sealing part 134 of the secondary battery 1. However, if the coil spring is used like the related art, the venting device may be complicated in structure and limited in miniaturization. Thus, according to an embodiment of the present invention, the plate spring 153 may be used to simplify the structure of the venting device 15 and miniaturize the venting device 15 so as to be inserted into the sealing part 134 of the secondary battery 1.

Figure 5:
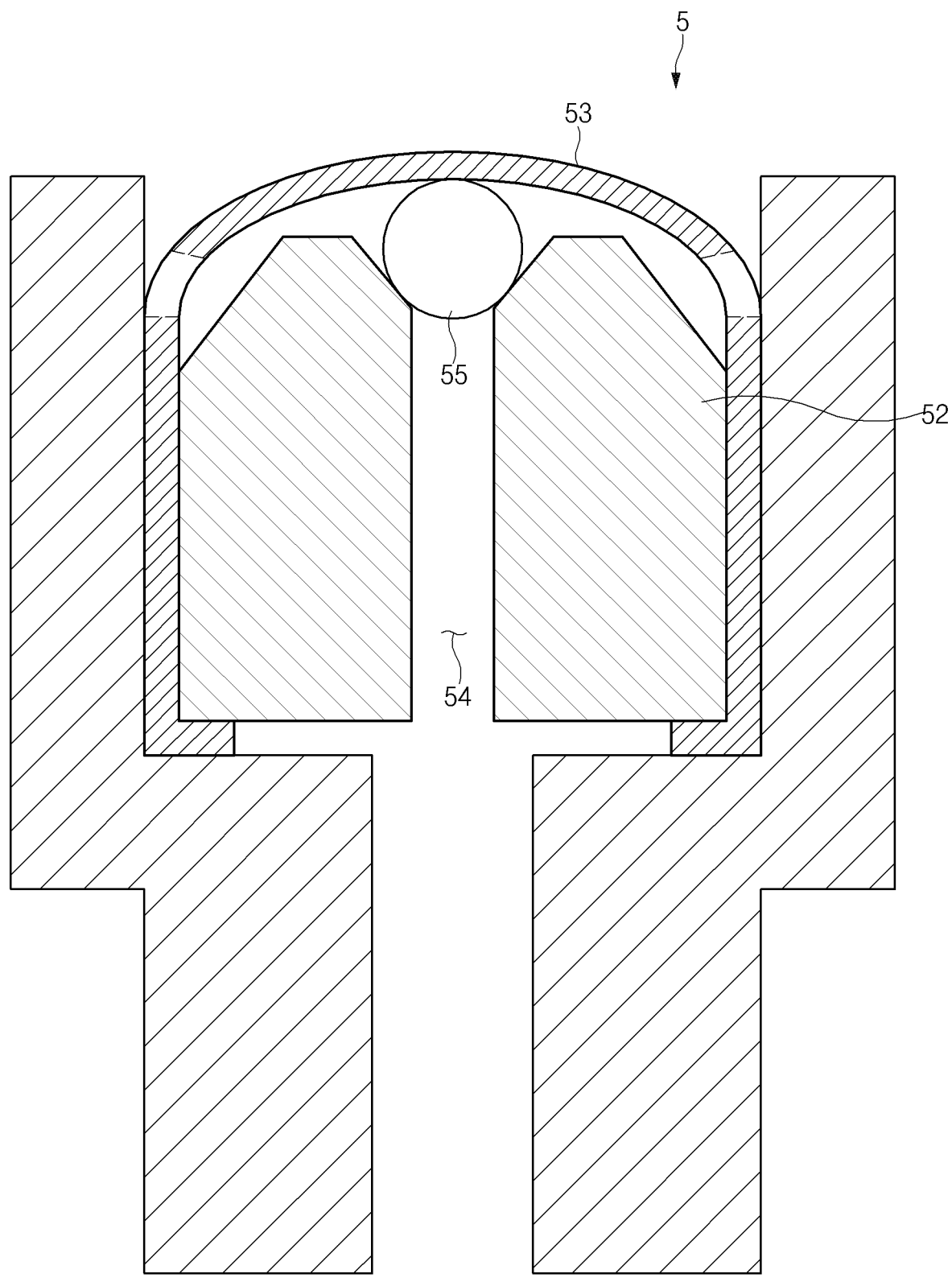
FIG. 5 is a schematic view of the venting device in which a ball has a spherical shape.

FIG. 5 is a schematic view of the venting device 5 in which the ball 55 has a spherical shape.

The ball 155 may be disposed between the plate spring 53 and the sheet 52 so as to contact or be spaced apart from the sheet 52, thereby opening and closing the passage 54. However, when the ball 55 has the spherical shape as illustrated in FIG. 5, the plate spring 53 may be largely bent even though a state in which the ball 55 contacts the sheet 52 to close the passage 54 is a state in which external force relatively minimally acts to the plate spring 53. Therefore, when the plurality of venting devices 5 are manufactured, there is a problem that a deviation occurs in opening pressure between the plurality of venting devices 5 according to a degree of bending of the plate spring 53. Also, there is a problem that a deviation occurs in opening pressure between a numerical value of the opening pressure, which is designed before manufacturing the venting device 15, and an actual opening pressure.

Furthermore, since the bent state of the plate spring 53 is maintained for a long time, a creep phenomenon occurs in the plate spring 53 to reduce the lifespan of the plate spring 53 and also reduce the lifespan of the whole venting devices 5.

Figure 6:
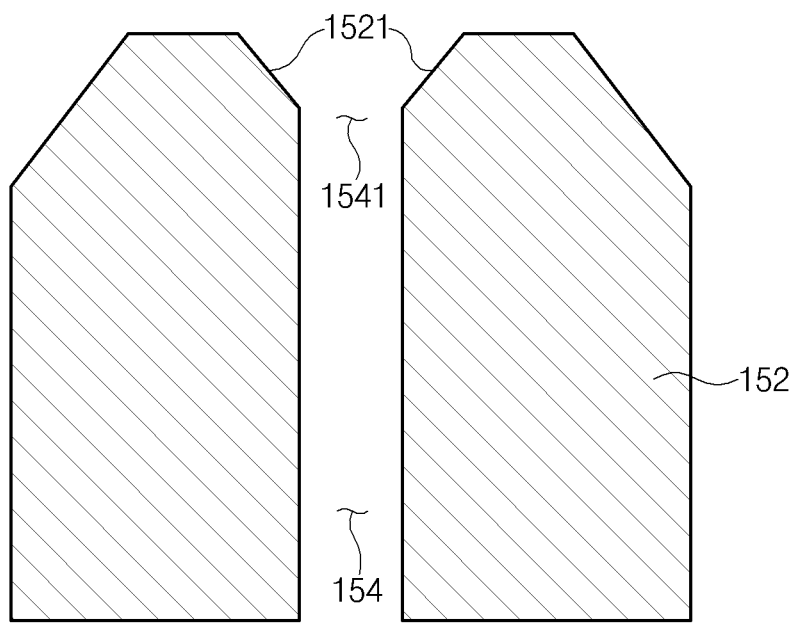
FIG. 6 is a schematic view of a sheet according to an embodiment of the present invention.

FIG. 6 is a schematic view of the sheet 152 according to an embodiment of the present invention.

The sheet 152 is formed in the housing 151, and the passage 154 passes through the sheet 152. The sheet 152 may be made of a metal to improve durability, but may also be made of polymer to prevent a gap between components. In particular, the polymer may include a polyolefin-based polymer such as polypropylene (PP). As illustrated in FIG. 6, in the sheet 152, an edge of an inner circumference of a surface of the outlet-side of the passage 154 is chamfered or filleted.

Figure 7:
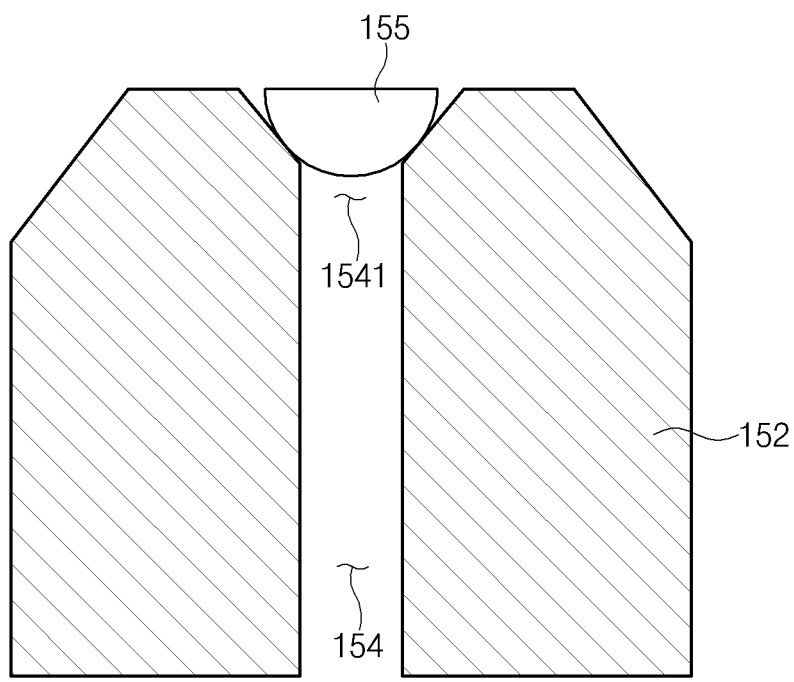
FIG. 7 is a schematic view illustrating a state in which the ball is seated on a sheet according to an embodiment of the present invention.

FIG. 7 is a schematic view illustrating a state in which the ball 155 is seated on the sheet 152 according to an embodiment of the present invention.

According to an embodiment of the present invention, the ball 155 may have a hemispherical shape and be disposed at the outlet-side of the passage 154 formed in the sheet 152. Also, the ball 155 may be disposed between the plate spring 153 and the sheet 152 so as to contact or be spaced apart from the sheet 152, thereby closing the passage 154. The ball 155 may be made of the polymer to more improve adhesion with respect to the sheet 152. However, the ball 155 may be made of a metal to improve durability.

The ball 155 has a hemispherical shape and is attached to an inner surface of the plate spring 153. Here, in order to be more easily attached to the plate spring 153, a plane rather than the hemispherical surface of the ball 155 is attached to the inner surface of the plate spring 153. The chamfered or filleted surface 1521 of the sheet 152 has a predetermined inclination. As illustrated in FIG. 7, the hemispherical surface of the ball 155 may face one surface 1521 of the sheet 152 and may be easily seated.

The ball 155 has a diameter less than the widest width of the one surface 1521 of the sheet 152 and larger than the narrowest width of the one surface 1521 of the sheet 152 so that the ball 155 is easily seated on the sheet 152. Then, when the ball 155 is seated, the plane of the ball 155 is formed at a height that is approximately similar to the highest point of the sheet 152. As a result, since the plate spring 153 is not largely bent even in a state in which the ball 155 closes the passage 154, the deviation in opening pressure between the venting devices 15 may be reduced, and also, the deviation in opening pressure between the numerical value of the opening pressure, which is designed before manufacturing the venting device 15, and the actual opening pressure may be reduced. More preferably, the plane of the ball 155 may be slightly higher than the highest point of the sheet 152. As a result, elastic force of the plate spring 153 may be efficiently applied to the ball 155 to improve the adhesion of the sheet 152 of the ball 155.

Figure 8:
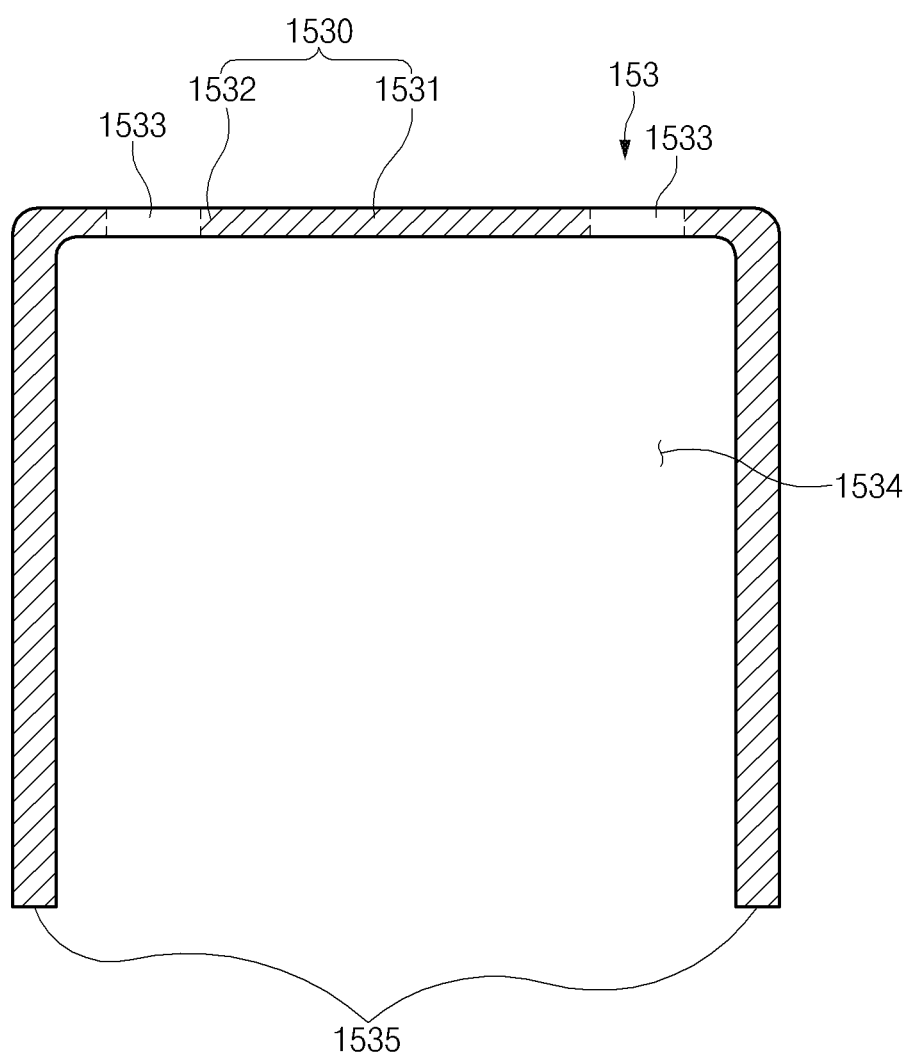
FIG. 8 is a schematic view of a plate spring according to an embodiment of the present invention.

FIG. 8 is a schematic view of the plate spring 153 according to an embodiment of the present invention.

The plate spring 153 may be manufactured by molding a metal plate. The metal plate has a wide and thin plate shape and is made of a metal. Particularly, the metal plate may include aluminum (Al) or stainless steel (STS). Also, a drawing process of elongating the metal plate through a punch may be performed to manufacture the plate spring 153. Particularly, the metal plate may be seated on a die, and a stripper may fix the metal plate. Then, the metal plate may be elongated through the punch to perform the drawing. As illustrated in FIG. 8, in the plate spring 153 manufactured as described above, the one side 1530 has a cap shape that is convex outward and provide an insertion space 1534 into which the sheet 152 is inserted. The one side 1530 of the plate spring 153 may mean a ceiling of the cap shape as illustrated in FIG. 8. However, the present invention is not limited thereto. For example, the one side 1530 of the plate spring 153 may include various portions.

The plate spring 153 has elastic force to open and close the passage 154 formed in the sheet 152 together with the ball 155 according to the internal pressure of the pouch. For this, it is preferable that a gas exhaust hole 1533 is punched in the one side 1530 of the plate spring 153. Here, the one side 1530 of the plate spring 153 includes a central portion 1531 formed in a center thereof and a peripheral portion 1532 extending outward from the central portion 1531. Also, since the ball 155 is attached to a bottom surface of a central portion 1531 of the one side 1530 to close the passage 154 formed in the sheet 152, the gas exhaust hole 1533 is not punched in the central portion 1531. Thus, it is preferable that the gas exhaust hole 1533 is punched in the peripheral portion 1532 of the one side of the 1530 of the plate spring 153.

An opening pressure of the venting device 15 may be changed according to the formed shape and area of the gas exhaust hole 1533. Thus, the gas exhaust hole 1533 may be adjusted in shape and area to adjust the opening pressure of the venting device 15. Here, the opening pressure means a specific pressure within the pouch when the venting device 15 is opened.

Figure 9:
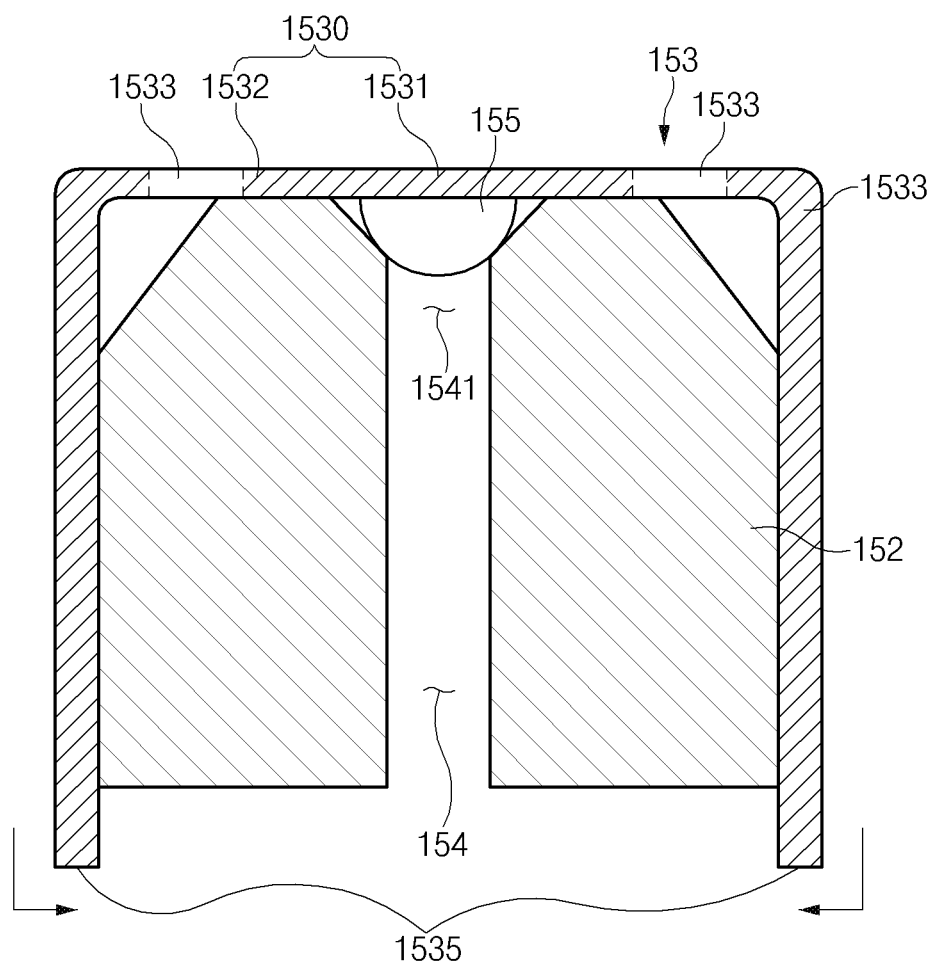
FIG. 9 is a schematic view illustrating a state in which the plate spring surrounds the sheet and the ball according to an embodiment of the present invention.

FIG. 9 is a schematic view illustrating a state in which the plate spring 153 surrounds the sheet 152 and the ball 155 according to an embodiment of the present invention.

When the plate spring 153 is manufactured, as illustrated in FIG. 9, the sheet 152 and the ball 155 are inserted into the insertion space 1534. As a result, the plate spring 153 surrounds the periphery of the sheet 152 and the ball 155. When the sheet 152 and the ball 155 are inserted into the insertion space 1534, it is preferable that the outlet-side of the passage 154 faces the one side 1530 of the plate spring 153. Thus, when the internal pressure of the pouch is less than a specific pressure, the one side 1530 of the plate spring 153 pushes the ball 155 inward from the outlet-side of the passage 154 formed in the sheet 152 to close the passage 154.

The ball 155 is formed in a hemispherical shape, and the plane rather than the hemispherical surface of the ball 155 is attached to the inner surface of the plate spring 153. Here, when the adhesive is applied to the plane of the ball 155, and the sheet 152 and the ball 155 are inserted into the insertion space 1534, the plane of the ball 155 is attached to the inner surface of the central portion 1531 of the plate spring 153. Here, after the ball 155 is seated first on the sheet 152, the ball 155 and the sheet 152 may be inserted into the insertion space 1534 of the plate spring 153, but is not limited thereto. For example, after the ball 155 is attached to the plate spring 153, the sheet 152 may be inserted into the insertion space 1534.

As described above, the gas exhaust hole 1533 may be formed in a peripheral portion 1532 of the one side 1530 of the plate spring 153. Thus, when the internal gas of the pouch pushes the one side 1530 of the plate spring 153 outward, the passage 154 is opened so that the gas leaks to the outlet 1541 of the passage 154. Here, the leaking gas has to be discharged to the outside through the gas exhaust hole 1533. Thus, in the sheet 152, the edge of the outer circumference of the outlet-side of the passage 154 may be chamfered or filleted. As a result, the gas may be guided to the gas exhaust hole 1533. Also, the one side 1530 of the plate spring 153 is pushed inward to provide a space to which the peripheral portion 1532 of the one side 1530 of the plate spring 153 moves inward.

Figure 10:
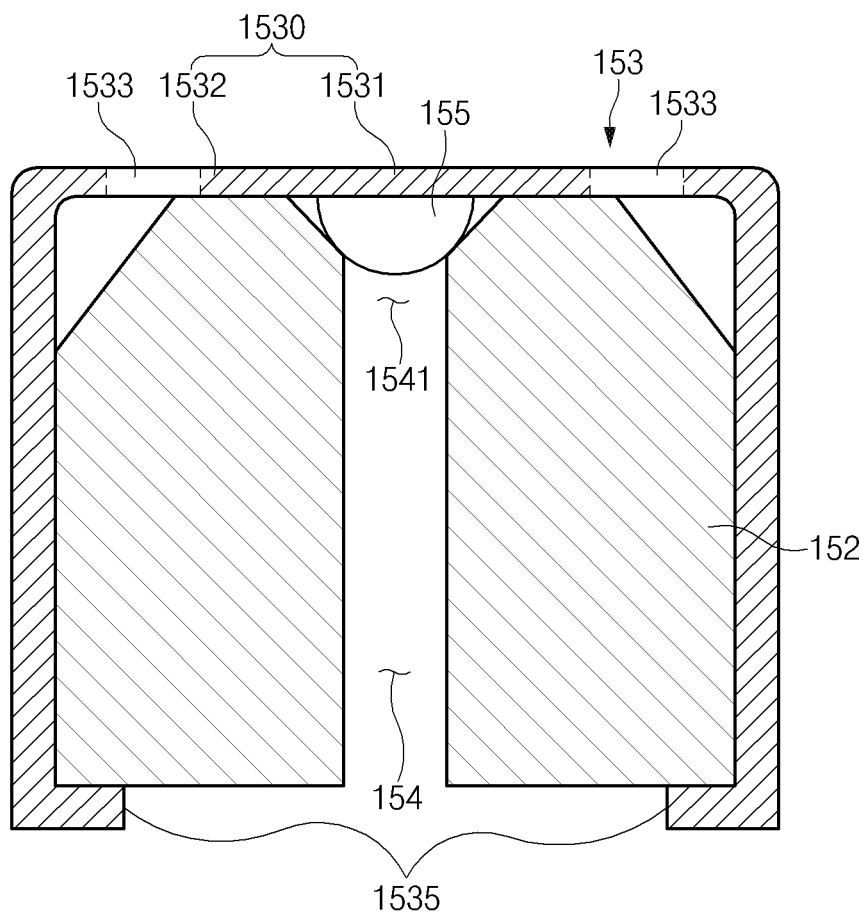
FIG. 10 is a schematic view illustrating a state in which an end of the other side of the plate spring is bent toward the sheet according to an embodiment of the present invention.

FIG. 10 is a schematic view illustrating a state in which an end 1535 of the other side of the plate spring 153 is bent toward the sheet 152 according to an embodiment of the present invention.

It is preferable that the plate spring 153 is firmly fixed to the sheet 152. Thus, when the internal gas of the pouch pushes the one side 1530 of the plate spring 153 outward through the ball 155, the one side 1530 of the plate spring 153 moves outward. Here, the plate spring 153 is not entirely slid, but only one side 1530 of the plate spring 153 is deformed to move. If the plate spring 153 is slid, the plate spring 153 may be separated from the venting device 15. Particularly, only the central portion 1531 of the one side 1530 may be pushed outward, and the peripheral portion 1532 of the one side 1530 may move inward. Thus, the internal gas of the pouch may be discharged to the outside through the passage 154.

According to an embodiment of the present invention, after the sheet 152 and the ball 155 are inserted into the insertion space 1534, the end 1535 of the other side of the plate spring 153 is bent toward the sheet 152 as illustrated in FIG. 10. As a result, even though the internal gas of the pouch pushes the one side 1530 of the plate spring 153 outward, the detachment (separation) of the plate spring 153 from the sheet 152 may be prevented to fix the plate spring 153 to the venting device 15 without separating the plate spring 153 from the venting device 15.

Figure 11:
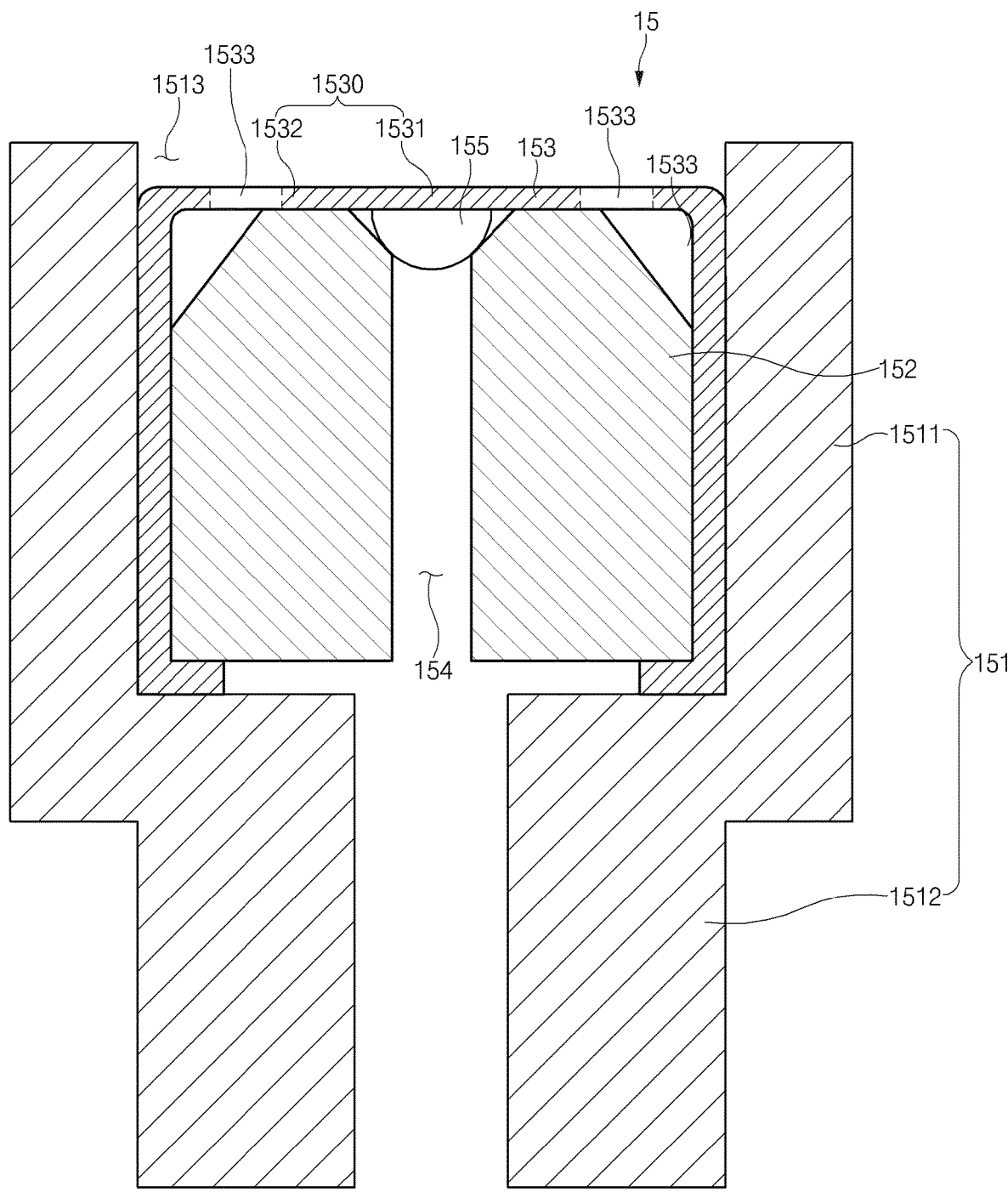
FIG. 11 is a schematic view illustrating a configuration of the venting device manufactured by inserting the plate spring and the sheet into a housing according to an embodiment of the present invention.

FIG. 11 is a schematic view illustrating a configuration of the venting device 15 manufactured by inserting the plate spring 153 and the sheet 152 into the housing 151 according to an embodiment of the present invention.

The plate spring 153 into which the sheet 152 is inserted is inserted into the housing 151 as illustrated in FIG. 11. As a result, the venting device 15 according to an embodiment of the present invention may be completely manufactured. The venting device 15 manufactured as described above is inserted into the sealing part 134 of the pouch so as to be sealed together.

Here, if the housing 151 includes the upper housing 1511 and the lower housing 1512, it is preferable that the plate spring 153 and the sheet 152 are included in the upper housing 1511. Also, as illustrated in FIG. 11, it is preferable that the one side 1530 of the plate spring 153 faces an opening end of the upper housing 1511. Thus, the gas may be discharged to the outside through the gas exhaust hole 1533 formed in the one side 1530.

Also, as described above, the plate spring 153 is not slid as a whole, but only one side 1530 is deformed in the fixed state. Thus, it is preferable that a gap between the plate spring 153 and the housing 151 is minimized when the plate spring 153 is inserted into the housing 151 so that frictional force acts largely between an outer circumferential surface of the plate spring 153 and an inner circumferential surface of the housing 151. However, the present invention is not limited thereto. In order that the frictional force further increases, surface roughness of the outer circumferential surface of the plate spring 153 or the inner circumferential surface of the housing 151 may increase so that a frictional coefficient increases. Furthermore, the plate spring 153 may be fixed to the housing 151 through various methods, for example, a method in which a separate adhesive is applied between the plate spring 153 and the housing 151, or a protrusion protrudes from one of the plate spring 153 and the housing 151, and a groove is formed in the other of the plate spring 153 and the housing 151.

Figure 12:
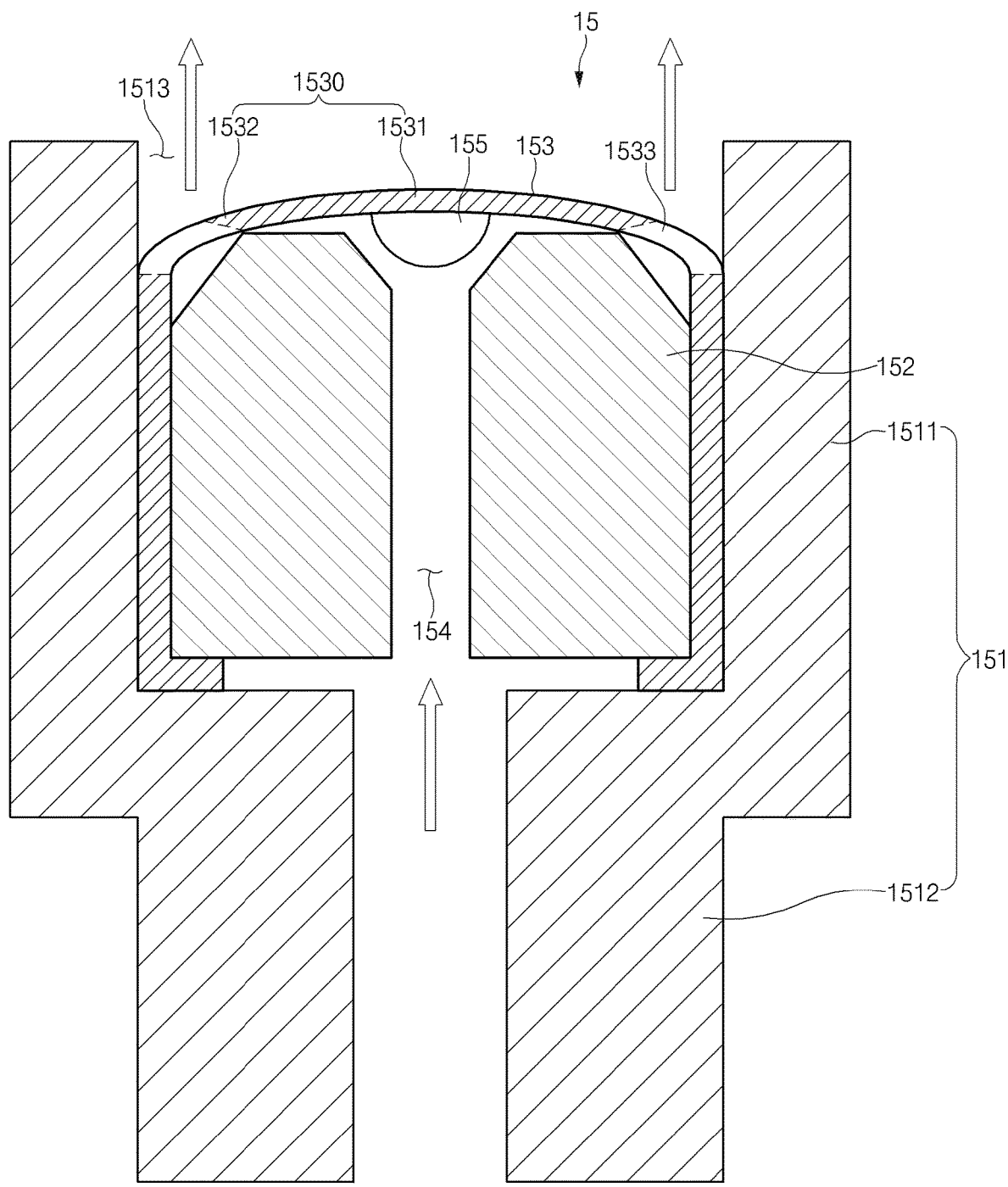
FIG. 12 is an operation diagram illustrating an operation of the venting device according to an embodiment of the present invention.

FIG. 12 is an operation diagram illustrating an operation of the venting device 15 according to an embodiment of the present invention.

In addition, when the secondary battery 1 is stored at a high temperature, an electrochemical reaction between the electrolyte and the electrode active material is quickly accelerated by the high temperature to generate a gas.

When the gas is generated in the pouch to gradually increase in internal pressure of the pouch and thus exceed a specific pressure, as illustrated in FIG. 12, the gas pushes the ball 155 outward. As a result, since the ball 155 is pushed, the one side 1530 of the plate spring 153 is pushed outward. Also, the plate spring 153 may be spaced apart from the sheet 152 so that the ball 155 is separated from the sheet 152 to open the outlet 1541 of the passage 154. Therefore, the gas within the pouch may be discharged to the outside through the passage 154 and the gas exhaust hole 1533. Here, as described above, it is preferable that the plate spring 153 is not slid with respect to the sheet 152.

When the gas within the pouch is sufficiently discharged to the outside, the internal pressure of the pouch decreases again, and thus, the pressure of the gas pushing the plate spring 153 outward decreases. However, the plate spring 153 is made of the metal and thus has the elasticity. Thus, when the internal pressure of the pouch is less than a specific pressure, the plate spring 153 returns to its original position by the elasticity of the plate spring 153. Also, the ball 155 is pushed inward from the outlet-side of the passage 154 formed in the sheet 152 by the elastic force of the plate spring 153. As a result, the ball 155 is in close contact with the one surface 1521 of the sheet 152 to close the outlet 1541 of the passage 154.

Figure 13:
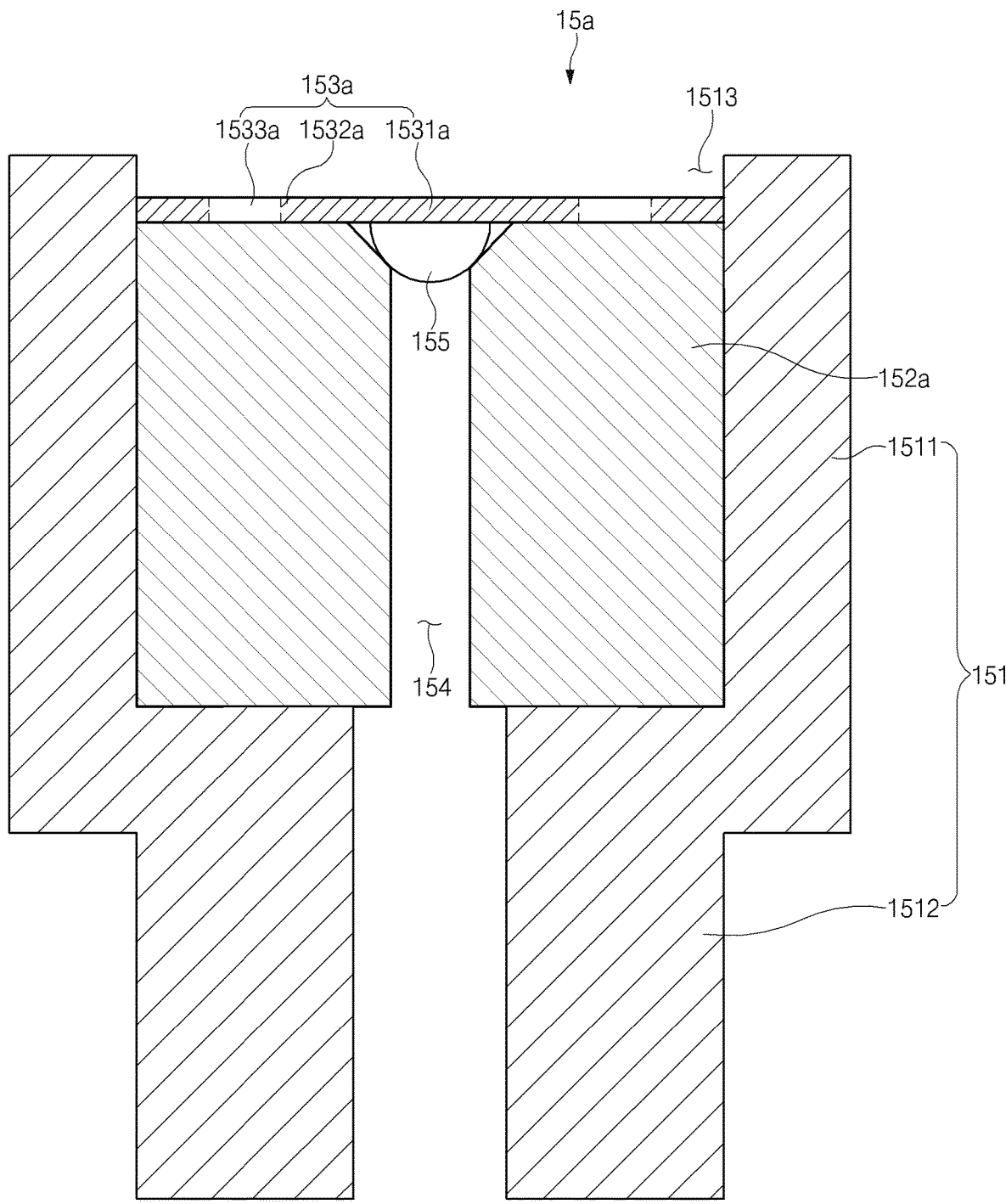
FIG. 13 is a schematic view illustrating a state in which a venting device is completely manufactured according to another embodiment of the present invention.

FIG. 13 is a schematic view illustrating a state in which a venting device 15a is completely manufactured according to another embodiment of the present invention.

According to an embodiment of the present invention, the plate spring 153 has the cap shape of which the one side 1530 is convex outward, and the sheet 152 and the ball 155 are inserted into the insertion space 1534 formed in the plate spring 153. However, since the plate spring 153 has the cap shape, it may not be easy to attach the plane of the ball 155 to the correct position of the inner surface of the plate spring 153.

Accordingly, in the venting device 15a according to another embodiment of the present invention, as illustrated in FIG. 13, a plate spring 153a has a flat plate shape and contacts a sheet 152a. Also, a separate fixing ring (not shown) may be inserted into an upper housing 1511 so as to be fixed to an upper portion of the plate spring 153a. The fixing ring has elasticity, and when being inserted into the upper housing 1511, external force may be applied to reduce a diameter, and then, after being inserted into the upper housing 1511, the external force may be removed to increase in diameter again. Thus, when the elastic force acts as normal force on an inner circumferential surface of the upper housing 1511, friction force between the fixing ring and the inner circumferential surface of the upper housing 1511 may increase.

Therefore, according to another embodiment of the present invention, the ball 155 may be easily attached to an accurate position of the inner surface of the central portion 1531a of the plate spring 153a, and the plate spring 153a may be easily fixed to the inside of the housing 1511 through the separate fixing ring.

Figure 14:
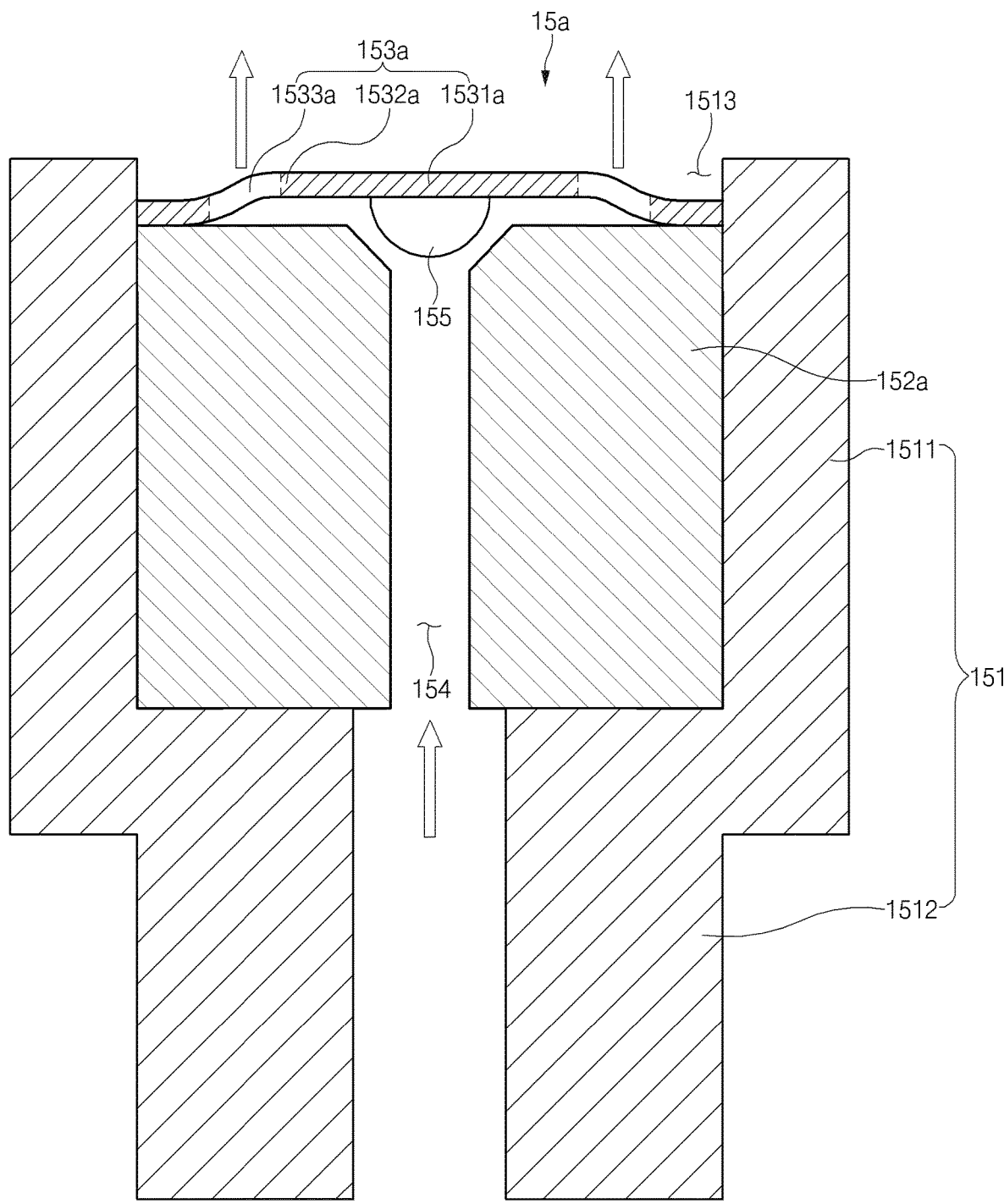
FIG. 14 is an operation diagram illustrating an operation of the venting device according to another embodiment of the present invention.

FIG. 14 is an operation diagram illustrating an operation of the venting device 15a according to another embodiment of the present invention.

In the venting device 15a according to another embodiment of the present invention, when an internal pressure of a pouch exceeds a specific pressure, as illustrated in FIG. 14, a gas pushes the ball 155 outward, and thus, as the ball is pushed, the plate spring 153a is also pushed outward. Also, the plate spring 153 may be spaced apart from a sheet 152a so that the ball 155 is separated from the sheet 152a to open an outlet 1541 of a passage 154. Thus, a gas within the pouch may be discharged to the outside through the passage 154 and a gas exhaust hole 1533.

When the gas within the pouch is sufficiently discharged to the outside, the internal pressure of the pouch decreases again, and thus, the pressure of the gas, which pushes the plate spring 153a outward, decreases. Thus, when the internal pressure of the pouch is less than the specific pressure, the plate spring 153a returns to its original position by the elastic force of the plate spring 153a. Also, the ball 155 is pushed inward from a side of an outlet 1541 of the passage 154 formed in the sheet 152a by the elastic force of the plate spring 153a. As a result, the ball 155 is in close contact with one surface 1521 of the sheet 152a to close the outlet 1541 of the passage 154.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A venting device for insertion into a sealing part of a pouch of a secondary battery, the venting device comprising:
    a housing configured to be inserted between two surfaces of the sealing part so as to be sealed together with the sealing part;
    a ball support disposed in the housing and defining a passage through which an inside and an outside of the pouch are configured to communicate with each other;
    a plate spring configured to open and close the passage according to an internal pressure of the pouch and made of a metal having elasticity; and
    a ball disposed between the ball support and the plate spring so as to contact or be spaced apart from the ball support at an outlet-side of the passage, thereby opening and closing the passage,
    wherein the ball has a hemispherical shape having a flat upper surface that is attached to a flat inner surface of the plate spring,
    wherein the ball support has a flat upper surface extending around the passage, and
    wherein when the passage is closed by the ball, the flat upper surface of the ball and the flat upper surface of the ball support are approximately coplanar with one another.

2. The venting device of claim 1, wherein the plate spring comprises:
    a central portion formed at a center thereof; and
    a peripheral portion extending outward from the central portion,
    wherein the ball is attached to the central portion, and
    a gas exhaust hole is defined in the peripheral portion.

3. The venting device of claim 1, wherein the plate spring has one side having a cap shape that is convex outward and provides an insertion space into which the ball support and the ball are inserted therein.

4. The venting device of claim 3, wherein an end of another side of the plate spring is bent toward the ball support inserted into the insertion space.

5. The venting device of claim 1, wherein the plate spring has a flat plate shape and contacts the ball support.

6. The venting device of claim 1, wherein, in the ball support, an edge of an inner circumference of a surface of the outlet-side of the passage is chamfered or filleted.

7. The venting device of claim 1, wherein, in the ball support, an edge of an outer circumference of a surface of the outlet-side of the passage is chamfered or filleted.

8. The venting device of claim 1, wherein the housing comprises an upper housing and a lower housing, which have shapes or sizes different from each other.

9. The venting device of claim 8, wherein the lower housing has a width less than a width of the upper housing.

10. The venting device of claim 8, wherein the upper housing has a circular cylinder shape, and the lower housing has an oval cylinder shape.

11. A pouch type secondary battery in which the venting device of claim 1 is inserted into a sealing part of a pouch.

12. A battery module comprising the pouch type secondary battery of claim 11 as a unit cell.

13. A device comprising the battery module of claim 12.

14. The device of claim 13, wherein the device comprises a computer, a notebook, a smart phone, a mobile phone, a tablet PC, a wearable electronic device, a power tool, an electric vehicle (EV), a hybrid electric vehicle (HEV), a plug-in hybrid electric vehicle (PHEV), or a power storage device.

15. The venting device of claim 1, wherein the metal of the plate spring is aluminum or stainless steel.

* * * * *